April 5, 1966     S. DANILUK     3,244,047
STOCK LOCATING AND SEVERING DEVICE
Filed Nov. 1, 1963     4 Sheets-Sheet 1
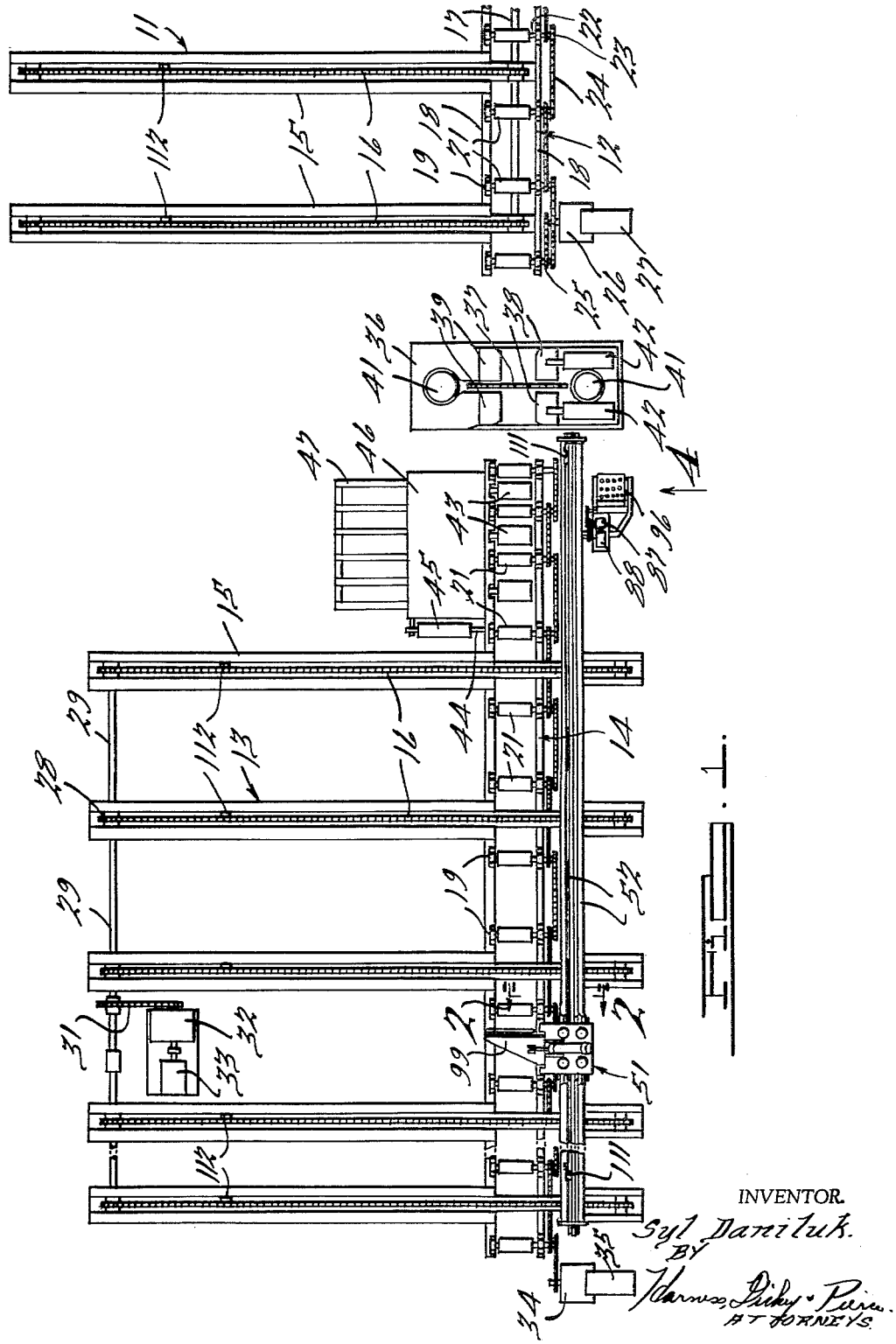
INVENTOR.
Syl Daniluk.
BY
Karnes, Dickey & Pierce.
ATTORNEYS

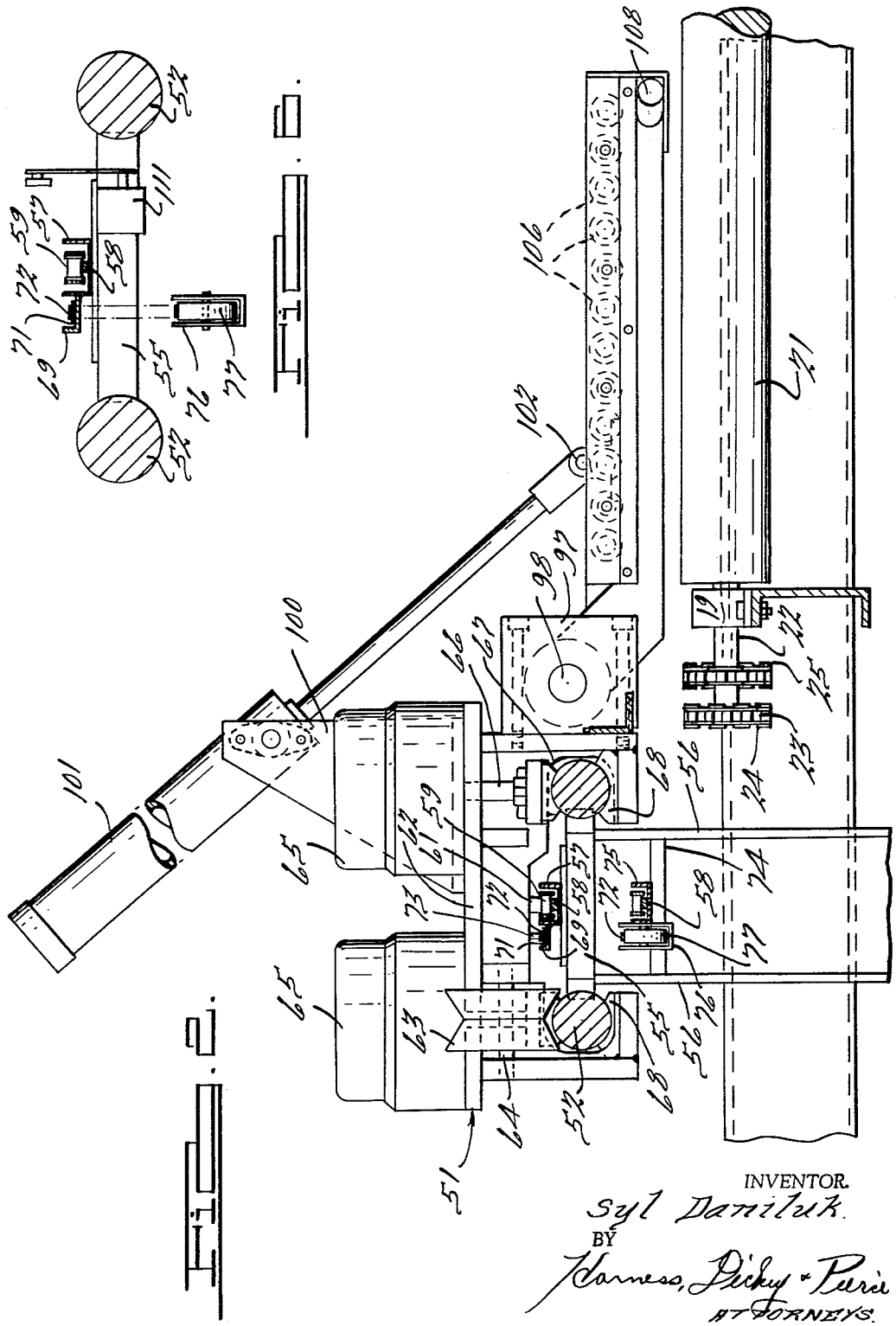

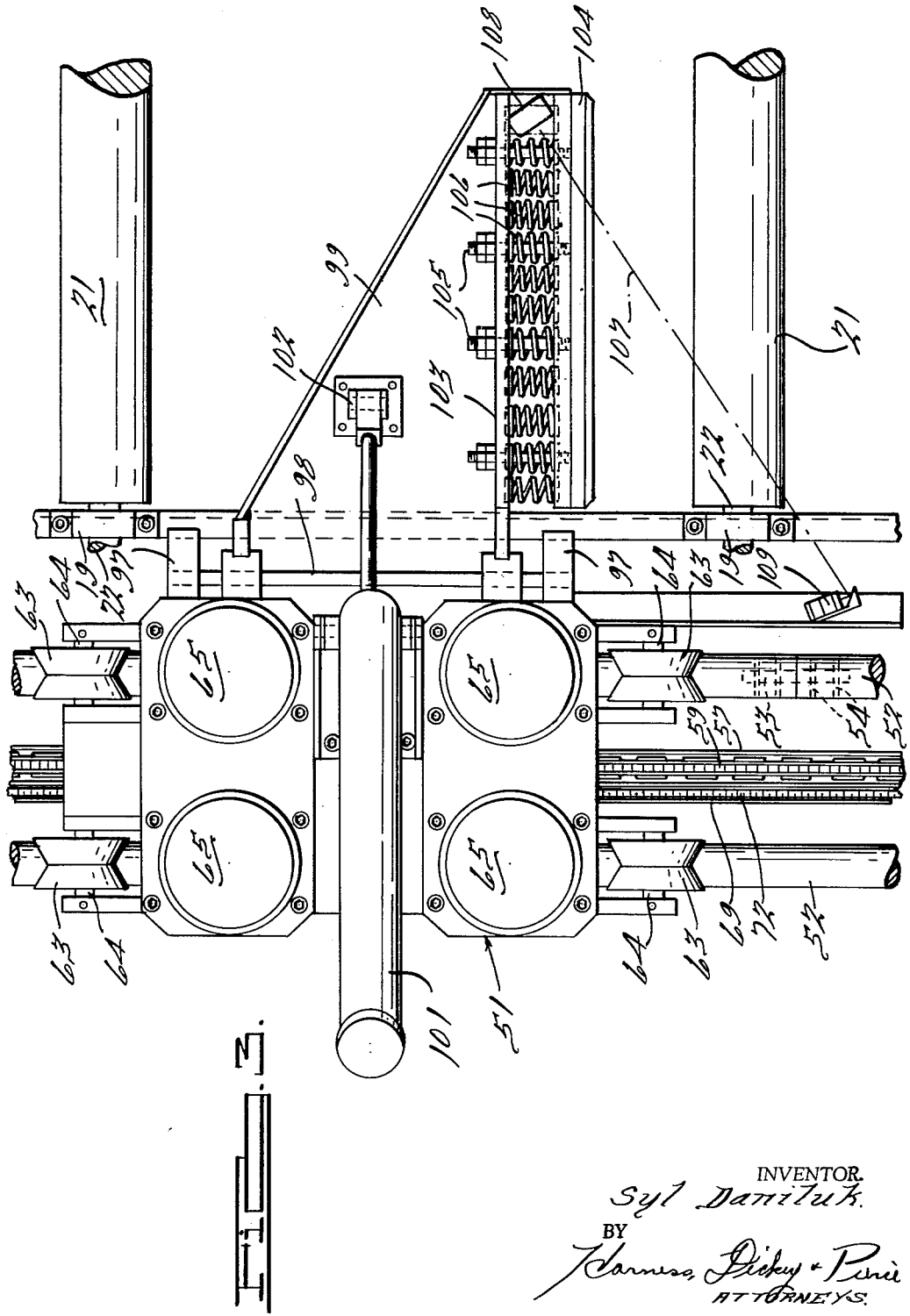

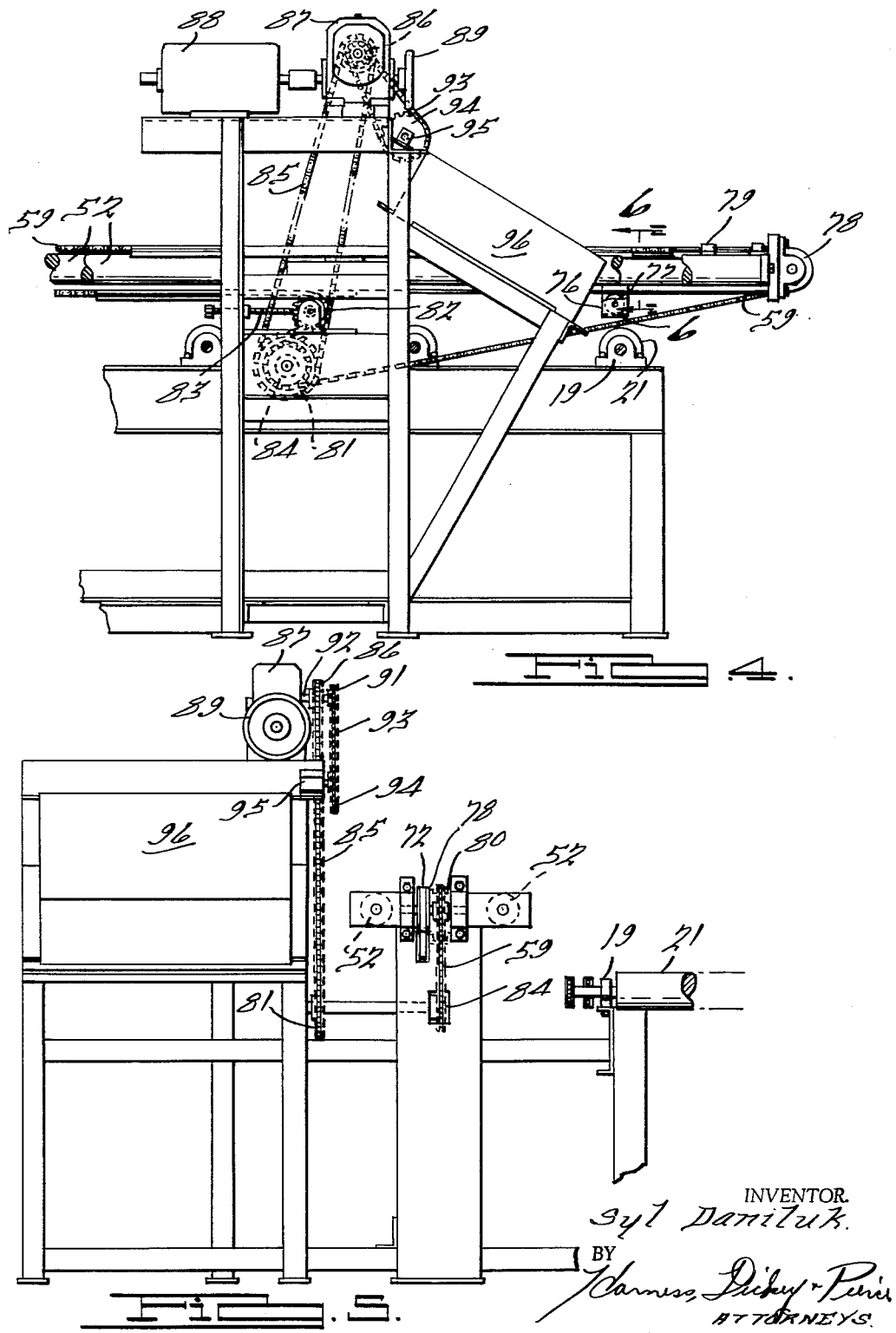

United States Patent Office 3,244,047
Patented Apr. 5, 1966

3,244,047
STOCK LOCATING AND SEVERING DEVICE
Syl Daniluk, Windsor, Ontario, Canada, assignor to McInnis Conveyors Limited, Ontario, Canada
Filed Nov. 1, 1963, Ser. No. 320,876
6 Claims. (Cl. 83—269)

This invention relates to stock locating and severing devices and particularly to a device for accurately locating a section of stock relative to a cutting element.

The use of cranes and manpower for handling and cutting elongated stock to prescribed lengths is time consuming and adds materially to the cost of each severed section. By employing the device of the present invention the saving in equipment and man hours results in substantial lowering of the cost of each severed section. The device embodies a roller conveyor on which a length of beam stock or the like is advanced from a chain conveyor disposed normally thereto. The severed length is removed from the roller conveyor at the opposite end of the device by a similar chain conveyor. An operator at a control station advances the length of beam stock beneath a cutting device which may be a torch, a saw, a shear or any other cutting implement and stops the advancement when the point to be cut is disposed adjacent to the cutting element. A locating carriage on the downside of the roller conveyor is movable on a pair of heavy rods by a driven chain and manually positioned by adjusting a measuring tape moved with the carriage relative to a fixed pointer. Power operated brake shoes are moved downwardly of the carriage to positively engage the rods and raise the carriage wheels therefrom. A spring-backed stop plate on the carriage has a sonar device projecting a ray across the path of the advancing beam stock for reducing the high speed drive of the conveyor to slow speed operation. The end of the beam stock strikes the stop plate and is stopped as the springs deflect and return the stock to an exact location. Thereafter the beam stock is clamped in the cutting machine and the cutting element is operated to sever the measured length from the beam stock with a cut which is exactly normal to the beam length. Thereafter the stop plate is raised to permit the severed length to be advanced past the stop plate which is then lowered in position to stop the beam stock which is thereafter advanced. When the remaining length of the beam stock becomes shorter than the lengths to be cut therefrom and if shorter lengths are desired, the carriage wheels are lowered onto the supporting rods and the carriage is quickly located to measure the shorter lengths. The shorter lengths are cut from the remainder of the beam stock without removing the beam stock from the roller conveyor.

Accordingly, the main objects of the invention are: to provide chain conveyors onto which beams and like stock may be stored and advanced to and from a roller conveyor which moves and locates the stock relative to a device which performs an operation thereon; to locate a stop carriage on spaced rods by a tape carried thereby and clamp the carriage on the rods when in accurately located position; to drive the roller conveyor at fast speed and at slow speed when the end of the beam stock interrupts the ray of a sonic device positioned adjacent to a stop plate against which the end of the beam stock abuts to locate the length to be severed; to advance a length of beam stock past a severing device to accurately locate a length to be severed and thereafter clamp the beam stock in the severing device where the measured length is cut, and in general to provide a conveyor system for handling elongated elements to be severed which is simple in construction, positive in operation and economical of manufacture.

Other objects and features of novelty of the invention will be specifically pointed out or will become apparent when referring, for a better understanding of the invention, to the following description and in conjunction with the accompanying drawings, wherein:

FIGURE 1 is a plan view of a conveying, measuring and severing device embodying features of the present invention;

FIG. 2 is an enlarged sectional view of the structure illustrated in FIG. 1, taken on the line 2—2 thereof;

FIG. 3 is plan view of the structure illustrated in FIG. 2;

FIG. 4 is an enlarged broken view of the structure illustrated in FIG. 1, as viewed from point 4 thereof;

FIG. 5 is a right-hand view of the structure illustrated in FIG. 4, and

FIG. 6 is an enlarged sectional view of the structure illustrated in FIG. 4, taken on the line 6—6 thereof.

Referring to FIG. 1, the device of the present invention embodies a loading conveyor system 11 for advancing stock to a roller conveyor 12 and an unloading conveyor system 13 for removing stock on which work was performed from a roller conveyor 14. The loading conveyor system embodies a plurality of stations 15, each having a chain 16 thereon which are driven from sprockets on a shaft 17 from a driven speed reducing device, not illustrated. The roller conveyor 12 embodies uprights for supporting spaced channels 18 on which spaced pillow blocks 19 are secured. The pillow blocks 19 support shafts 22 of rollers 21 to one end of which sprockets 23 are secured. Pairs of the sprockets are interconnected by chains 24 driven by a chain 25 from a speed reducing unit 26 and motor 27. The motor is driven at slow and high speeds, the high speed being in the order of 80 feet a minute while the slow speed is approximately 8 feet a minute. These speeds are only given by way of example and can be varied to conform to the type of material which is being handled.

The unloading conveyor system 13 has stations 15 with chains 16 thereon supported over sprockets 28 and driven from a shaft 29 by a chain and sprocket drive 31 from a speed reducer 32 driven by a motor 33. The roller conveyor 14 is similar to the conveyor 12 the various sets of chains thereof being driven by a speed reducer 34 and a motor 35. When a beam section is to be severed from a length of beam stock, the driving of the shaft 17 advances a beam on the conveyor 11 to the roller conveyor 12 and through and beyond the severing device. The severed length on the conveyor 14 may be advanced from the end thereof or transferred to the unloading conveyor system 13 and moved laterally therefrom.

A work-performing machine 36 is situated between the roller conveyors 12 and 14 in position to have a section of the beam stock pass therethrough when advanced to a stop position. The machine 36 herein illustrated is a rotary saw having a blade 37 and clamping jaws 38 and 39. The support for the saw is moved upwardly and downwardly on a pair of columns 41 and it is to be understood that a shear, a burning torch or any suitable device may be employed for severing the sections from the beam stock. The jaws 38 are moved toward the jaws 39 by cylinders 42 for clamping the beam stock when being severed. The piece of beam stock too short to be severed is removed from the conveyor 14 by arms 43 which are tilted by the operation of a piston 44 of a cylinder 45. The piece slides down a sloping plate 46 onto stacking rails 47. Beams and columns of all sizes having H, I or L sections, or which may be flat stock, to be cut up into lengths, can be passed through the machine 36.

A locating carriage 51 is supported on a pair of long cylindrical rods 52 which are made of short lengths joined together by a pin 53 disposed on the centerline of the abutting ends and secured in position by pins 54. The rods are spaced a predetermined distance apart by plates 55 which are secured thereto and to uprights 56. The plates support an upwardly presenting channel strip 57 containing a land 58 on which a roller chain 59 is driven. The roller chain is secured by a boss 61 to a platform 62 of the carriage. Four wheels 63 are mounted on the platform 62 on shafts 64. The platform supports four housings 65 containing bellows (not illustrated) to which a fluid is directed for advancing piston rods 66 and brake shoes 67 carried thereby downwardly against the top of the rods 52. The downward movement of the piston rods 66 is intercepted when the brake shoes 67 engage the rods causing the platform to be lifted and a bottom set of brake shoes 68 to be raised into engagement with the bottom of the rods 52 to thereby securely clamp the platform on the rods.

An upwardly presented channel element 69 extending from the side of the channel element 57 having a low friction strip 71 of nylon, Teflon or the like in the bottom, onto which a measuring tape 72 slides, the tape being secured to the platform 66 by the boss 73. Beneath the spaced plates 56 cross members 74 are mounted on uprights 56 for supporting a second upwardly presented channel element 75 directly beneath the channel element 57. The return portion of the roller chain 59 rides on the land 58 within the channel element 75. Upwardly presented channel elements 76 are secured to the side of the channel element 75 for aligning low friction rollers 75 supported thereby beneath the channel element 69. The return portion of the tape 72 rides on the rollers 75 with the side having the indicium thereon disposed in engagement with the rollers so that very little wear will occur thereto. The tape passes over a pair of free running pulleys 78 mounted at each end of the rods 52 with the upper section passing beneath an index finger 79 by which the carriage is accurately located. The index finger 79 is spaced a predetermined distance from the cutting saw 37 and the tape is so attached to the platform as to provide exact reading of the distance from the saw 37 to the stop element of the carriage which will be the length of the piece which will be severed. The roller chain 59 passes over a pair of sprockets aligned with the pulleys 78, over a driving sprocket 81 and about a takeup sprocket 82 which is adjustable by a screw 83 in the conventional manner. The sprocket 81 is driven from a sprocket 84 by a chain 85 from a sprocket 86 of a speed reducing unit 87. The speed reducer unit is driven by a motor 88 and may be manually driven by a hand wheel 89. A second sprocket 91 on the speed reducer shaft 92 drives a chain 93 and a sprocket 94 on the shaft of a counter 95. The sprockets 91 and 94 are so related as to register a predetermined distance on the counter, such as one turn for each foot advanced so that the operator located at a panel board 96 can roughly estimate the position of the carriage 51 so that the drive motor 88 can be stopped and the carriage adjusted by the hand wheel 89 to have the exact length to be severed read from the tape at the index finger 79. Very little time is required to change the position of the carriage to have it accurately measure a length to be severed from the advanced stock.

Referring more specifically to FIGS. 2 and 3, the platform 62 carries bosses 97 for a shaft 98 on which a frame 99 is pivoted for raising and lowering movement by a ram 101 having a piston secured thereto on a pin 102. An upstanding plate 103 on the frame 99 has a plurality of studs 105 of a stop plate 104 movable in apertures therethrough. A plurality of heavy springs 106 are disposed between the stop plate 104 and the plate 103 for the purpose of absorbing the shock of stopping the heavy length of beam stock which is moved back to a measured position upon the expansion of the springs 106. A ray 107 passes from a sender 108 to a receiver 109 which is interrupted by the beam before reaching the stop plate 104. While a light or any other ray could be employed, a sonic ray is preferred as it is not affected by dirt or grime which may collect on the sending or receiving devices. The rollers 21 are driven at high speed until the ray 107 is interrupted whereupon the rollers are driven at low speed and carry the forward end of the beam against the plate 104. The rollers may be stopped at this point or may operate at slow speed since the beam is clamped in position on the severing machine when it has been accurately located by the stop plate 104. Switches 111 are mounted at each end of the machine in position to be engaged by the platform 62 for stopping the advancement of the carriage before it reaches either end of the rods 52.

The panel board 96 contains switch buttons for operating relays and other devices for releasing and clamping the stock in the cutting machine, for operating the carriage 51 forwardly and reversely on the rods 52, for controlling the drive speed of the motor 88, for raising and lowering the stop plate 104 and for raising and lowering the scrap discharge arms 43. The panel also contains switch buttons which control the in and out feed of the conveyor systems 11 and 13 and for driving the roller conveyors 12 and 14. A single operator, standing at the panel board, has complete control of the device for advancing a length of beam stock onto the roller conveyor 12 for advancing the stock past the saw 37, for adjusting the carriage 51, for measuring a length of stock to be sawed, for clamping the stock when a length has been measured, for operating the saw or other severing device and for moving the severed length from the roller conveyor 14. For moving the stock by the chains 16, spring pressed pivoted dogs 112 are secured thereon which pass under the stock in one direction of chain movement and engage the stock when the chains are moved in the opposite direction to carry the stock along therewith. Since the circuitry for the control system is well within the knowledge of one skilled in the art, it has not been illustrated and described herein.

What is claimed is:

1. In a device for severing lengths from elongated stock, a severing machine, a first conveyor for advancing stock to the machine, a second conveyor aligned with said first conveyor for receiving and advancing the elongated stock past the machine, a pair of spaced rods extending along the side of said second conveyor, a carriage having wheels engaging said rods, clamping means on said carriage movable into engagement with said rod and raising the wheels therefrom, a stop plate on said carriage movable into and out of the path of the elongated stock advanced on said second conveyor, and means for driving said carriage along said rods toward and away from said machine.

2. In a device for severing lengths from elongated stock, a severing machine, a first conveyor for advancing stock to the machine, a second conveyor aligned with said first conveyor for receiving and advancing the elongated stock past the machine, a pair of spaced rods extending along the side of said second conveyor, a carriage having wheels engaging said rods, clamping means on said carriage movable into engagement with said rod and raising the wheels therefrom, a stop plate on said carriage movable into and out of the path of the elongated stock advanced on said second conveyor, means for driving said carriage along said rods toward and away from said machine, a tape on said carriage advanced therewith, and means adjacent to said severing machine and said tape by which the distance of the stop plate from the severing machine means may be accurately located.

3. In a device for severing lengths from elongated stock, a severing machine, a first conveyor for advancing stock to the machine, a second conveyor aligned with said first conveyor for receiving and advancing the elongated stock past the machine, a pair of spaced rods extending along the side of said second conveyor, a carriage having wheels engaging said rods, clamping means on said carriage movable into engagement with said rod and raising the wheels therefrom, a stop plate on said carriage movable into and out of the path of the elongated stock advanced on said second conveyor, means for driving said carriage along said rods toward and away from said machine, a tape on said carriage advanced therewith, means adjacent to said severing machine and said tape by which the distance of the stop plate from the severing machine means may be accurately located, and a counter device driven by the drive means of said carriage which indicates the approximate position of the carriage on the rods as it is driven therealong.

4. In a device for severing lengths from elongated stock, a severing machine, a first conveyor for advancing stock to the machine, a second conveyor aligned with said first conveyor for receiving and advancing the elongated stock past the machine, a pair of spaced rods extending along the side of said second conveyor, a carriage having wheels engaging said rods, clamping means on said carriage movable into engagement with said rod and raising the wheels therefrom, a stop plate on said carriage movable into and out of the path of the elongated stock advanced on said second conveyor, means for driving said carriage along said rods toward and away from said machine, a tape on said carriage advanced therewith, means adjacent to said severing machine and said tape by which the distance of the stop plate from the severing machine means may be accurately located, and a counter device driven by the drive means of said carriage which indicates the approximate position of the carriage on the rods as it is driven therealong, and a hand wheel on said drive means for accurately positioning said carriage before it is clamped to the rods.

5. In a device for severing lengths from elongated stock, a severing machine, a first conveyor for advancing stock to the machine, a second conveyor aligned with said first conveyor for receiving and advancing the elongated stock past the machine, a pair of spaced rods extending along the side of said second conveyor, a carriage having wheels engaging said rods, clamping means on said carriage movable into engagement with said rod and raising the wheels therefrom, a stop plate on said carriage movable into and out of the path of the elongated stock advanced on said second conveyor, means for driving said carriage along said rods toward and away from said machine, and switch means near each end of the length of the rods for interrupting the drive means for the carriage to prevent the carriage from moving from the ends of the rods.

6. In a device having a driven conveyor on which a length of workpiece is advanced relative to a machine which performs a work operation thereon, a support disposed parallel to said conveyor, a carriage movable on said support, means for driving said carriage along said support and conveyor, a continuous tape secured to said carriage passing over pulleys disposed in a vertical plane near the ends of said support, a channel for guiding the top run of the tape at the top side of the support and a plurality of rollers beneath said channel with which the indicia face of the bottom run of the tape contacts to produce the rotation thereof.

References Cited by the Examiner

UNITED STATES PATENTS

| 581,417 | 4/1897 | Feister | 83—522 |
| 944,972 | 12/1909 | Simpson | 83—159 |
| 1,461,425 | 7/1923 | Linebaugh | 83—522 X |
| 1,939,441 | 12/1933 | Einig | 83—367 X |
| 2,599,591 | 6/1952 | Spiller et al. | 83—522 X |
| 2,711,006 | 6/1955 | Abbey | 83—112 X |
| 3,013,459 | 12/1961 | Coleman | 83—365 X |
| 3,141,367 | 7/1964 | Keener et al. | 83—268 X |
| 3,155,242 | 11/1964 | Magloire | 83—269 X |

WILLIAM W. DYER, JR., *Primary Examiner.*

WILLIAM S. LAWSON, *Examiner.*